United States Patent [19]

Dunlop et al.

[11] 4,017,461

[45] Apr. 12, 1977

[54] METHOD FOR MANUFACTURING LIQUID RESINOUS FURAN-FORMALDEHYDE CONDENSATION PRODUCTS

[75] Inventors: Andrew P. Dunlop, Riverside; Rudy F. Macander, Cary, both of Ill.

[73] Assignee: The Quaker Oats Company, Chicago, Ill.

[22] Filed: Jan. 2, 1976

[21] Appl. No.: 646,193

[52] U.S. Cl. .......................... 260/67 R; 260/67 F; 260/347.8
[51] Int. Cl.² ................. C08G 16/00; C08G 2/08
[58] Field of Search ............ 260/67 R, 67 F, 67 FP, 260/347.8

[56] References Cited

UNITED STATES PATENTS

| | | | |
|---|---|---|---|
| 2,306,924 | 12/1942 | Zerweck et al. | 260/67 F |
| 2,450,108 | 9/1948 | Bremner et al. | 260/347.5 |
| 2,486,392 | 11/1949 | Dunlop et al. | 260/67 F |
| 2,601,497 | 6/1952 | Brown | 260/67 F |

*Primary Examiner*—Lucille M. Phynes
*Attorney, Agent, or Firm*—Joseph P. O'Halloran

[57] ABSTRACT

Liquid resinous condensation products are produced by contacting furan and formaldehyde in the presence of an acid catalyst while maintaining an excess of furan during the contacting. The method produces liquid resinous condensation products which are useful as binders in the manufacture of composite articles, or as binder modifiers.

31 Claims, No Drawings

METHOD FOR MANUFACTURING LIQUID RESINOUS FURAN-FORMALDEHYDE CONDENSATION PRODUCTS

BACKGROUND OF THE INVENTION

This invention relates to the manufacture of liquid resinous furan-formaldehyde condensation products. The liquid resinous condensation products are useful in manufacturing composite articles such as, for example, foundry sand shapes such as cores and molds. They are also useful in the manufacture of resinforced composite articles such as, for example, fiber glass-bound composite articles.

U.S. Pat. No. 2,306,923 issued to Werner Zerweck, et al. on Dec. 29, 1942 is entitled "Hard Infusible Resinous Condensation Products". The Zerweck patent discloses the acidic condensation of furan and formaldehyde under conditions which lead to hard and infusible resinous condensation products. The method set forth by Zerweck is regarded as being most undesirable, if not unsuitable, for the commercial manufacture of liquid condensation products having viscosities falling within predetermined desired ranges.

Although the Zerweck patent indicates that the condensation of Zerweck may be carried out in several steps and that soluble alkylol compounds may be isolated, and at a subsequent time further advanced, our study led to conclude that under the reactant ratio conditions of Zerwecke the extent of the exothermic polymerization is extremely difficult to control at reasonably elevated temperatures, and that relatively small inadvertent variations in the control of processing parameters, particularly contacting temperatures, result in unacceptable, on occasion, disastrous exothermic advancement of the viscosity of the resin.

W. H. Brown and H. Swatsky authored and article "The Condensation of Furan and Sylvan With Some Carbonyl Compounds" which was published Sept. 1956 in the Canadian Journal of Chemistry (pages 1147–1153). They reported that they obtained difurylmethane from the reaction of furan and formaldehyde. Our study of the Brown and Swatsky reactant ratio condition revealed that the extent of the exothermic polymerization, under the reactant ratio conditions of Brown and Swatsky, is also extremely difficult to control and that relatively small inadvertent variations in the control of processing parameters, particularly contacting temperature, results in unacceptable, on occasion disastrous exothermic advancement of the viscosity of the product.

For example, in a number of tests, closed glass laboratory pressure reaction vessels, though immersed in a heat exchange bath, exploded. Moreover, when relatively small variations in operating parameters result in the uncontrolled advancement of the resins to viscosities in excess of 100,000 cps, with or without sudden high pressures, we regard the process as totally unacceptable for commercial use with respect to the production of liquid resins having viscosities in desired predetermined useful viscosity ranges.

An object of the present invention is to provide useful liquid resins and to provide a method for commercially producing liquid condensation products which are useful in the manufacture of binders in producing commercial composite articles such as foundry cores, molds, reinforced articles, and the like.

A further object of the present invention is to provide a method of condensing furan and formaldehyde which is relatively easily controllable with respect to obtaining desired viscosities of the resulting resinous materials and which method utilizes conditions which are sufficiently reactive to permit substantial and relatively high conversions of the furan in reasonable reaction times. Another object of the present invention is to provide a method of condensing furan and formaldehyde which has not resulted in undesirable run-away polymerization which can result in the solidification of the reaction mass in the reactor. It is a further object of a preferred embodiment of the present invention to provide methods, in accordance with the present invention, by which desired reactivities, as well as desired viscosities can be produced. It is a further object of preferred embodiments of the present invention to provide methods by which condensation products having a desired degree of reactivity ranging from substantially non-reactive with respect to acid catalyzed polymerization to very reactive with respect to acid catalyzed polymerizaton. Also, it is an object of the present invention to provide a method by which it is possible to produce resins having relatively low free formaldehyde levels. It is an additional object of this invention to provide a method to produce resins which are useful as a binder in the manufacture of composite articles such as glass fiber-reinforced articles, and foundry sand shapes, for example.

In accordance with broad aspects of the present invention, formaldehyde is coupled with a furan of the formula:

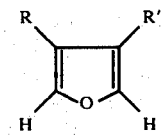

where R and R' are hydrogen, halogen, alkyl, phenyl, alkyl-substituted phenyl, halogen substituted phenyl, hydroxyalkyl, carboxycarboxyalkyl, in which the alkyl constituents have from 1 to 10 carbons, said coupling taking place in the presence of a catalytically effective amount of an acid catalyst and under sufficiently high temperature and for a period of time sufficient to produce a liquid resin under conditions in which the molar ratio of furan/formaldehyde is maintained to provide a substantial molar excess of furan at all times. That is, the conditions are maintained to provide 1.1 or more mole of furan per mole of formaldehyde, preferably maintaining 1.2 or more moles of furan per mole of formaldehyde.

In accordance with the present invention the furans which are coupled with formaldehyde include any furans with both alpha carbons unsubstituted. Particularly preferred, of course, is furan, itself. Also contemplated for use in accordance with the invention are the beta carbon substituted furans such as, for example, 3-chlorofuran, 3-bromofuran, 3-methylfuran, 3-ethylfuran, 3-n-propylfuran, 3-phenylfuran, 3-isopropylfuran, 3-carboxyfuran, 3-p-chlorophenylfuran, 3-p-methylphenylfuran, 3-p-nonylphenylfuran, and di substituted furans, such as, for example, 3-methyl-4-n-butylfuran, 3,-4-di-n-propylfuran, 3,4-di-methylfuran, 3,4-di-ethylfuran, 3,4-di-n-propylfuran, 3,4-di-isopropylfuran, 3-decylfuran, 3-hexylfuran, 3-hydroxymethylfuran, 3-(2-hydroxymethyl)furan, 3,4-di-carboxyfuran 3-(2-propionic acid)furan, and the like.

When the term halogen is employed herein, all of the halogens are contemplated, although of course chlorine is a particularly preferred halogen.

In accordance with the preferred embodiment of the present invention furan and formaldehyde are coupled in he presence of a catalytically effective amount of an acid catalyst and under sufficiently high temperature and for a period of time sufficient to produce a liquid resinous condensation product under conditions in which the molar ratio of furan/formaldehyde is maintained to provide a substantial molar excess of furan at all times. That is, the conditions are maintained to provide 1.1 mole, or more, of furan per mole of formaldehyde. Under more preferable conditions the relative quantities of furan and formaldehyde are such, during the condensation contacting that 1.2 or more moles of furan per mole of formaldehyde is maintained. It is to be understood that, depending on the desired character of the resin, and its intended use, higher, or lower ratios may be preferred in a particular instance.

The contacting can take place in aqueous or nonaqueous systems and furthermore can take place in the presence of inert solvents, if desired. In accordance with preferred aspects of the present invention, the conversion of the furanaldehyde reaction mass is continued until more than 75 percent conversion of the formaldehyde is achieved. In view of the fact that a wide range of relatively high contacting temperatures can be employed, the quantity of catalyst which constitutes a catalytically effective quantity of catalyst also enjoys wide latitude, in accordance with the present invention, and the quantity of catalyst which produces the desired viscosity range under specific time and temperature conditions can be determined easily using simple tests. The wide range of catalyst concentrations which can be employed in accordance with the present invention is further illustrated with the aid of the specific examples herein. For example, from 0.1 to 2.5 grams oxalic acid per 3 moles of furan gave results which were entirely satisfactory in accordance with the present invention.

The acidic materials which can be used in accordance with the present invention to provide the acid catalyst can range from soluble homogeneous catalyst systems to insoluble and even solid heterogeneous catalyst systems. For example, solid acidic materials such as, for example, acidic ion exchange resins are eminently satisfactory for use in accordance with the present invention. In addition, soluble organic and inorganic acids are also imminently satisfactory for use as catalysts in accordance with the present invention. Generally speaking, acids having a pKa member of less than 3 are preferred, while acids having a pKa member of less than 1.7 are most preferred. Acids having higher pKs numbers are also useful, however. Carboxylic acid catalysts such as, for example, benzoic, malonic and oxalic acid, and the like, are preferred acids for use as catalysts. In addition, strong or weak inorganic acid catalysts, such as, for example, phosphoric acid, sulfuric acid, hydrochloric acid, can be employed in accordance with the present invention. Also, inorganic-organic acids such as, for example, p-toluene sulfonic acid can be employed. Also acid salts such as sodium hydrogen sulfate, and Lewis acid such as $FeCl_3$, can be employed.

Generally speaking, it is preferred that the contacting temperature be at least 30° C. in order to provide a reasonably fast rate of reaction. Temperature below 30° C., and temperatures in excess of 110° C., for example up to 150° C. or higher, are useful but are generally unnecessary in view of the reasonably fast rate of reaction in the 30°–110° C. range.

The contacting temperature is not critical, and the nature of the acid catalyst employed is not critical in accordance with the present invention. In those embodiments of the present invention in which it is desired to reproduce production of resins having viscosities falling within predetermined ranges, the contacting times, contacting temperatures, and the strength of the acid catalysts are somewhat interrelated. The temperature, and time, which is useful in producing a resin having a predetermined viscosity is readily determined, with the aid of the disclosure herein, using simple tests. For example, generally speaking, the weaker acids, as determined by pKa, will require higher contacting temperatures or longer contacting times to produce a resin of the same viscosity as that resin produced by a stronger acid catalyst during contacting at lower temperatures and/or shorter contacting time. Likewise, a lower concentration of a stonger acid can be used at higher temperature to provide a resin of similar viscosity. Generally speaking, within the first few hours of reaction, when comparing a number of tests, as the contacting temperature employed increases, the extent of conversion increases, and the viscosity increases. However, when tests which are carried out to the same degree of conversion are compared, the higher temperatures gave lower viscosity resins. It will be appreciated by those skilled in the art, that given this disclosure, a wide range of conditions including specific range of molar ratios of furan to formaldehyde, temperatures, contacting times can be employed without departing from the spirit or scope of the present invention.

In addition, it is noted that furan is a relatively low boiling liquid and it is highly desirable in accordance with preferred aspects of the present invention to conduct the acidic contacting condensation step in a closed pressurized system wherein the temperature of the furan is maintained at a temperature above its boiling point at atmospheric pressure.

A number of the useful liquid resins produced in accordance with the method of this invention were distilled under greatly reduced pressure, and it was found that most of the resin constitutes substantially non-distillable material which we have not yet characterized.

In the following example all parts are expressed in parts by weight, all temperatures are expressed in degree centigrade and all percents are expressed in percent by weight based on 100 parts by weight of the material then being referred to.

EXAMPLE 1

The purpose of this example is to illustrate a series of condensation reactions using oxalic acid under conditions which are in accordance with the present invention. Furan, formalin (37 percent formaldehyde) and oxalic acid are charged to a pressure reaction apparatus made from Hastelloy steel. The reactor was equipped with heating and cooling means, and was equipped with a stirrer. The reactor, with the above mentioned ingredients in the related amounts set forth in Table I sealed therein, was heated to the reaction temperature set forth in Table I during a 30 minute period of time, and was held at the reaction temperature for the time set forth in Table I. The pressure was observed during the process, and it never exceeded 40 psig; for example, during a 50° C. reaction run. After the time set forth in Table I the reactor was cooled and the reaction mass was poured into an equal volume of water containing slight excess of sodium hydroxide based on quantity of acid catalyst. The reactor was rinsed with methylene chloride and the methylene chloride wash was added to the resin. The water-reaction mass mixture was poured into a separatory apparatus and an aqueous layer separated from an organic layer. The aqueous layer was extracted three times with methylene chloride and the resulting methylene chloride containing the extract was combined with the organic layer mentioned above. The aqueous layer was saturated with sodium chloride and then re-extracted with methylene chloride, and this methylene chloride solution was added to the organic layer also. The entire organic mass was stripped under reduced pressure to provide a black syrup.

The results of this first series of illustrative tests are set forth in Table I herein. In Table I the term "cure time" is determined as follows: The resin syrup (10.0 gram) was added to a 6 ounce paper cup and 20 drops of catalyst (a mixture of 50 percent N-methylaniline-HCl, 31 percent aniline-HCl, 10 percent furfural, and the balance, water) was thoroughly admixed therewith at room temperature. The tests cups were then placed in an oven and maintained at 50° C. The samples were checked every 5 minutes for the first 15 minutes, then on the first half-hour, and then on every hour for 3 hours, then every 12 hours. The test was ended when the resin became at least as hard as the rubber on a tire.

In Table I "viscosity" refers to measurements made on the Brookfield Synchro-Lectric Viscometer, Model L.V.F. In Table I the term "% Free Formaldehyde" is determined by chemical analysis.

lyst level, reaction temperature. Yet run 17 has a contacting time of 4 hours and produced a viscosity of 36,500 cps whereas run 18 has a contacting time of only 3 hours, and at 3 hours had advanced precipitously to 97 percent conversion and a viscosity of over 100,000. Also, it is noted that runs 16, 17 and 18 are identical except for temperature, yet run 16 gave a viscosity of 428 cps, whereas only 10° C. higher temperature gave precipitous advancement to 36,500 cps in run 17 and over 100,000 cps in run 18.

On the other hand, tests numbered 1–15 are all in accordance with the present invention having the furan-formaldehyde molar ratios present as set forth in Table I to provide an excess of furan at all times. It is noted that the viscosities are all relatively low and that no precipitious advancement in the pattern of viscosity vs. ratio-time-temperature is in evidence.

It is noted that tests numbered 1–12 all utilize a 2.0 furan/formaldehyde molar ratio, tests 13 and 14 utilize a 1.5 furan/formaldehyde molar ratio, and test 15 utilizes a 1.2 furan/formaldehyde molar ratio. It is also noted that as the level of formaldehyde drops and that as the percent of conversion increases towards complete consumption of the aldehydes, the viscosity of the resulting resin tends to decrease rather than increase. Upon continued cure the viscosity of the resin tends to increase, however. For example, the comparison of runs numbered 6 and 8 shows that 3 hours at 70° C. provides a viscosity of 680 when 39 percent of the furan and about 40 percent of the formaldehyde was converted, whereas 3 hours at 60° C. also provides a viscosity in the same general range (694) when about 45 percent of the furan and about 96 percent of the formaldehyde is converted. One would expect the viscosity to increase, but surprisingly the viscosity does not increase as the complete reaction of the formaldehyde is achieved, under conditions of the present invention. Also, for example, 2 hours at 70° C. led to a conversion to the extent of 44 percent of the furan and

TABLE I

Reaction of furan with formaldehyde in the pressure reactor with oxalic acid as catalyst.

| Test No. | Mole Ratio Furan/Formaldehyde | Oxalic Gr. | Temp. ° C. | Time (hr) | Conversion (%) H₂Oinsol/H₂Osol | | Vicosity (cps) | Cure Time (hr) | % Free CH₂O |
|---|---|---|---|---|---|---|---|---|---|
| 1 | 2.0 | 2.5 | 50 | 1½ | 8 | 5 | 75 | 0.1 | |
| 2 | 2.0 | 2.5 | 50 | 2 | 12 | 2 | 85 | 0.1 | |
| 3 | 2.0 | 2.5 | 50 | 2½ | 19 | 2 | 84 | 0.1 | |
| 4 | 2.0 | 2.5 | 50 | 3 | 18 | 2 | 324 | 0.1 | |
| 5 | 2.0 | 2.5 | 60 | 2 | 29 | 2 | 320 | 0.1 | |
| 6 | 2.0 | 2.5 | 60 | 3 | 39 | 1 | 694 | 0.2 | 2.40% |
| 7 | 2.0 | 2.5 | 70 | 2 | 44 | — | 964 | 1.5 | 1.17% |
| 8 | 2.0 | 2.5 | 70 | 3 | 48 | — | 680 | 4 | 1.00% |
| 9 | 2.0 | 2.5 | 80 | 3½ | 51 | — | 940 | 48 | |
| 10 | 2.0 | 1.0 | 80 | 3 | 50 | — | 790 | 48 | 1.02% |
| 11 | 2.0 | 0.3 | 80 | 3 | 36 | — | 310 | .2 | |
| 12 | 2.0 | 0.1 | 80 | 3 | 20 | — | 110 | .1 | |
| 13 | 1.5 | 1.0 | 50 | 5 | 4 | 11 | 172 | 0.1 | |
| 14 | 1.5 | 2.5 | 60 | 3 | 38 | 1 | 373 | 0.1 | 5.28% |
| 15 | 1.2 | 2.5 | 60 | 3 | 51 | — | 838 | 0.1 | 4.72% |
| 16 | 1.0 | 2.5 | 60 | 3 | 49 | — | 428 | .1 | |
| 17 | 1.0 | 2.5 | 70 | 4 | 83 | — | 36,500 | 3 | |
| 18 | 1.0 | 2.5 | 70 | 3 | 97 | — | >100,000 | — | |
| 19 | 1.0 | 2.5 | 80 | 3 | 104 | — | >100,000 | — | |

With respect to the data set forth in Table I, it is noted that Tests numbered 16, 17, 18 and 19 are not in accordance with the present invention. These tests involved reaction ratios in which the furan and formaldehyde were present at a 1:1 molar ratio. It is noted that runs 17 and 18 have identical reactant ratio, cata- 88 percent of the formaldehyde and led to a viscosity of 964 (see run 7), whereas 3½ hours at 80° C. led to a conversion to the extent of 51 percent of the furan and all of the formaldehyde led to a lower viscosity of 790 (run 9). While we do not want to be bound by any particular theory, it is our belief based on repeated observation, that the furan/formaldehyde condensation reaction under the conditions of the present invention results in a mixture of polymeric structures which are either hydroxymethyl terminated or furan terminated. As long as an excess of formaldehyde is available the tendency towards the hydroxy-methyl-termination is substantial and the relatively high concentration hydroxymethyl substituents in the mixture contributes, in our hypothesis, to the higher viscosity character of the resulting resin. However, as the complete reaction of the formaldehyde is approached or completed, the tendency towards more complete furan-termination of the polymer mixture continues and as the furan-terminated structure increase and the hydroxymethyl terminated structures decrease, we believe the viscosity of the polymeric mixture drops correspondingly. It is also noted that the runs which we believe produced a mixture which is heavily furan-terminated, e.g. tests 9 and 10 exhibit relatively low reactivity.

Also, from an overall consideration of Table I, it will be appreciated that generally speaking, lower formaldehyde conversion reactions, that is reactions in which the polymerization is terminated at that point in time at which there remains substantial unreacted formaldehyde, results in compositions which are relatively low viscosity and relatively high reactivity. While we do not want to be bound by any theories in this regard, it is our belief, based on repeated observations, that the lower aldehyde conversion-higher reactivity relationship is a consequence of the greater extent of hydroxymethyl termination which is present as long as substantial unreacted formaldehyde remains in the system.

Also in interpreting the data set forth in Table I, it should be taken into consideration that when formalin is used, increasing the quantity of formaldehyde, also results in a dilution of the catalyst, for example, even though the same quantity of catalyst may have been added to the reactor.

It should be noted that the "work-up" method which is used to isolate the liquid resinous condensation product produced in accordance with the present invention can have an effect on the viscosity of the finally isolated product. For example, instead of extracting the liquid resinous condensation product from the aqueous reaction mixture, it is also possible to distill under reduced pressure to remove the water after the catalyst is neutralized. However, even when care is taken to neutralize the acid catalyst, traces of acidic materials tend to remain in the resin and tend to cause the resin to advance in viscosity during the distillation-type work-ups. For example, a production run in which resin is made in accordance with the present invention that produce a resin having a 680 cps viscosity, when repeated, using a distillation temperature of 50° C. under reduced pressure, instead of the extraction work-up described above, gave a viscosity of 8050 cps even though neutralization of the catalyst had been carried out. This, in planning for producing of resin in accordance with the present invention care must be taken during work-up to avoid undue advancement of the relatively reactive resin produced in accordance with the present invention.

Resins produced in accordance with the present invention, have been found to be useful as furan resins. For example, a resin produced in accordance with the present invention having a viscosity of 160 cps at 25° C. was admixed with Wedron silica sand in an amount sufficient to provide 1.25 percent binder based on the weight of the sand, 10 percent catalyst based on the weight of the resin was admixed therewith and shaped to form a foundry shape. Usable tensile strengths were observed both at high relative humidity and ambient relative humidity conditions. The catalyst used in the production of the sand-shape, e.g. for foundry use, was a mixture of 70 percent of p-toluene sulfonic acid and 30 percent water.

EXAMPLE 2

The purpose of this example is to illustrate the use of strong inorganic acids for the condensation in accordance with the present invention, as well as to illustrate an interrelation between temperature and catalyst concentration.

The tests reported in Table I were repeated in this example except that the time, temperature, mole ratio, and quantity of catalyst set forth in Table II were used. The results of the condensation with respect to the percent yield and viscosity of resulting resin are also summarized on Table II below. In each instance concentrated sulfuric acid was used as the catalyst.

In the runs reported in Table II formalin is generally used as the sole formaldehyde ingredient. Increasing the level of formalin results in an increased level of water and in a corresponding dilution of the catalyst. However, the "1+1" in run 25 under the formaldehyde column heading represents that 1 mole of formaldehyde is provided by means of formalin ingredient, and 1 mole of the formaldehyde was provided by means of anhydrous paraform as an ingredient.

It is noted that runs 21–24 all provided between 78–86 percent yields even though the mole ratio was 2:1 and the catalyst level varied from 3.5 grams per mole of formaldehyde to 0.25 grams of catalyst per mole of formaldehyde. Thus decreasing levels of catalyst gave substantially the same yield when the temperatures were increased correspondingly.

Test 25 indicates that the catalyst concentration, rather than quantity, is of particular importance inasmuch as the yield from run 25 was substantially identical to that of run 24. It is to be understood of course, that some increased yield in run 25 would be expected as a consequence of the slightly higher temperatures employed. Runs 26, 27 and 28 illustrate the use of other mole ratios of furan/formaldehyde with sulfuric acid in accordance with the present invention.

EXAMPLE 3

The purpose of this example is to illustrate the use of a variety of inorganic, inorganic-organic, and organic acids in accordance with the present invention. The procedure of Example 1 is repeated, except that the times, temperatures, quantities of ingredients, and catalyst set forth in Table III were employed. The results are also summarized in Table III. In run 29 hydrochloric acid was employed, and in run 30 a mixture of concentrated sulfuric and sodium sulphate was employed. In run 31 concentrated phosphoric acid was used in the amount stated. Runs 32 and 33 illustrate the use of malonic acid; run 34, methyl sulphonic acid; run 35, trichloroacetic; and run 36, benzoic.

TABLE II

| Run | Time | Temp. | Moles Furan | Mole CH$_2$O | Mole Ratio | Grams H$_2$SO$_4$ | % Yield | Vis. |
|---|---|---|---|---|---|---|---|---|
| 20 | 6 hr | 32° | 2 | 1 | 2:1 | 3.5 | 46 | Solid |
| 21 | 3 | 40 | 2 | 1 | 2:1 | 3.5 | 86 | 1880 |
| 22 | 3 | 45–50 | 2 | 1 | 2:1 | 1.0 | 80 | 540 |
| 23 | 3 | 50–55 | 2 | 1 | 2:1 | 0.5 | 81 | 550 |
| 24 | 3 | 60–65 | 4 | 2 | 2:1 | 0.5 | 78 | 457 |
| 25 | 3 | 65–70 | 4 | 1+1 | 2:1 | 0.25 | 78 | 534 |
| 26 | 3 | 60–65 | 3 | 2 | 1.5:1 | 0.5 | 80 | 2350 |
| 27 | 3 | 55–60 | 3 | 2.5 | 1.2:1 | 0.5 | 46 | 110 |
| 28 | 3 | 55–60 | 3 | 3 | 1:1 | 0.5 | 49 | 326 |

TABLE III

| Run | Time | Temp. | Moles Furan | Mole CH$_2$O | Grams Catalyst | % Yield | Vis. |
|---|---|---|---|---|---|---|---|
| 29 | 3 hr. | 70–75 | 4 | 2 | 0.5 HCl | 86 | 720 |
| 30 | 3 | 80–85 | 4 | 2 | 0.7 Na$_2$SO$_4$ + 0.5 H$_2$SO$_4$ | 89 | 478 |
| 31 | 1½ 3 | 65–70 75–80 | 4 | 2 | 2.5 H$_3$PO | 86 | 510 |
| 32 | 3 | 75–80 | 4 | 2 | 2.5 Malonic | 45 | 104 |
| 33 | 3 | 85–90 | 4 | 2 | 2.5 Malonic | 115 | 148 |
| 34 | 3 | 65–70 | 4 | 2 | 0.5 Me SO$_3$H | 79 | 655 |
| 35 | 3 | 65–70 | 4 | 2 | 0.5 Cl$_3$C CO$_2$H | 51 | 158 |
| 36 | 6 | 85–90 | 4 | 2 | 2.5 Benzoic | 14 | 71 |

EXAMPLE 4

The embodiments of the present invention which are illustrated in this Example constitute condensation reactions in which the contacting time at the temperature stated in Table IV is 3 hours in each instance, and in which the concentration of the oxalic acid catalyst is 1 percent based on the weight of the weight of the initial aqueous phase. In all the tests reported in Table IV a sealed steel autoclave reactor was employed. The reactor was fitted with mechanical stirring means and with thermostatically controlled cooling coils. The temperature of the contents of the reactor was continuously monitored by means of a thermocouple. The reaction ingredients consisting of furan and approximately 37 percent aqueous formaldehyde were charged to the reaction vessel in respective tests in the respective ratios as set forth in Table IV. As indicated above, the amount of oxalic acid catalyst added thereto was adjusted, in each respective test, to provide a 1 percent concentration of oxalic acid based on the weight of the initial aqueous phase. When the reactor was sealed, the reaction mass was heated along with vigorous mechanical stirring to the reaction temperature, which heating took approximately one-half hour. The cooling coils were employed to drop the temperature of the reaction mass below the respective maximum stated temperature whenever the temperature of the reaction mass tended to exceed the stasted range. As indicated above, the reaction mass was maintained within the respective range stated in Table IV for a period of 3 hours in each instance. Thereafter, the reactor was cooled, opened up, and the contents discharged therefrom and neutralized. The neutralizing procedure comprised the addition of a 5 percent aqueous sodium hydroxide solution in an amount sufficient to neutralize the aqueous phase to a pH in the range of 6.5–7 at room temperature. It was noted that upon addition of the base the pH of the aqueous phase shifted rapidly and that continued vigorous stirring was required to obtain an equilibrium pH in the range 6.5–7 within ½ hour. While it is not intended that the procedure be limited by any theoretical consideration, it is our belief based on repeated observation that organic acidic components were relatively slowly extracted from the organic phase during the course of the described neutralization process.

After the neutralization step, the organic phase was separated by decantation, from the aqueous phase, and the aqueous layer was extracted three times with methylene chloride. The resin organic layer and the methylene chloride extracts were then combined and stripped by distillation at 55° –60° C. for 2 hours at 40 mmHg. pressure. The resulting residue is then weighed, permitted to cool slowly to ambient room temperature and the viscosity, cure test, percent OH and percent 3 CH$_2$O were determined as set forth in Example 1. The results of this series of tests is set forth in Table IV herein.

TABLE IV

| Test No. | Temp. ° C. | Furan:CH$_2$O Ratio | % OH | % Free CH$_2$O | Yield* | Vis. | Cure |
|---|---|---|---|---|---|---|---|
| 37** | 75–80 | 0.9:1 | | | | 20,200 | |
| 38 | 80–85 | 0.9:1 | | | | 58,400 | |
| 39 | 85–90 | 0.9:1 | | | | 160,080 | |
| 40 | 90–95 | 0.9:1 | | | | 2,400,000 | |
| 41 | 95–100 | 0.9:1 | | | | 5,040,000 | |
| 42** | 75–80 | 1:1 | 3.29 | 3.0 | 78 | 3,640 | 3 hrs. |
| 43 | 80–85 | 1:1 | 2.14 | 2.0 | 88.4 | 16,200 | 6 hrs. |
| 44 | 85–90 | 1:1 | 2.44 | .99 | 94.1 | 83,000 | 8 hrs. |
| 45 | 90–95 | 1:1 | 2.08 | 1.43 | 94.3 | 305,600 | 8 hrs. |
| 46** | 95–100 | 1:1 | | | 96.3 | 110,400 | |
| 47 | 75–80 | 1.1:1 | | | 91.0 | 3,580 | 4 hrs. |
| 48 | 80–85 | 1.1:1 | 2.11 | 1.91 | 88.8 | 5,700 | 6 hrs. |
| 49 | 85–90 | 1.1:1 | 2.07 | 1.87 | 93.1 | 6,080 | 7 hrs. |

TABLE IV-continued

| Test No. | Temp. °C. | Furan:CH₂O Ratio | % OH | % Free CH₂O | Yield* | Vis. | Cure |
|---|---|---|---|---|---|---|---|
| 50 | 90-95 | 1.1:1 | 2.60 | .69 | 97.4 | 22,000 | 29 hrs. |
| 51 | 95-100 | 1.1:1 | | | 105 | 84,000 | |
| 52 | 75-80 | 1.2:1 | 3.95 | 2.21 | 83.4 | 3,300 | 1½ hrs. |
| 53 | 80-85 | 1.2:1 | 2.79 | 1.40 | 90.8 | 4,130 | 6 hrs. |
| 54 | 85-90 | 1.2:1 | .82 | .96 | 95.8 | 27,000 | 6 hrs. |
| 55 | 90-95 | 1.2:1 | 1.27 | 1.22 | 98.0 | 6,400 | 28 hrs. |
| 56 | 95-100 | 1.2:1 | | | 101 | 11,000 | |
| 57 | | | | | | 11,500 | |
| 58 | 75-80 | 1.3:1 | 4.11 | 2.59 | 82 | 2,240 | 3 hrs. |
| 59 | 80-85 | 1.3:1 | 2.90 | 1.86 | 91.5 | 2,830 | 6½ hrs. |
| 60 | 85-90 | 1.3:1 | 2.15 | 1.03 | 97.1 | 2,325 | 30 hrs. |
| 61 | 90-95 | 1.3:1 | 1.17 | 1.01 | 100 | 3,000 | 32 hrs. |
| 62 | 95-100 | 1.3:1 | | | 111 | 4,500 | |
| 63 | | | | | | 10,400 | |
| 64 | 75-80 | 1.4:1 | 3.22 | 1.44 | 92.1 | 2,625 | 6½ hrs. |
| 65 | 80-85 | 1.4:1 | 1.54 | 1.64 | 90.3 | 9,600 | |
| 66 | 85-90 | 1.4:1 | 1.78 | .91 | 101 | 1,720 | 30 hrs. |
| 67 | 90-95 | 1.4:1 | .72 | .69 | 106 | 3,200 | 32 hrs. |
| 68 | 95-100 | 1.4:1 | 1.62 | 1.13 | 107 | 1,850 | 32 hrs. |
| 69 | | | | | | 3,640 | |
| 70 | 75-80 | 1.6:1 | | | 98 | 1,475 | 14 hrs. |
| 71 | 80-85 | 1.6:1 | | | | | |
| 72 | 85-90 | 1.6:1 | | | 107 | 970 | |
| 73 | 90-95 | 1.6:1 | | | 104 | 1,300 | |
| 74 | 75-80 | 2:1 | | | 98.1 | 506 | |
| 75 | 80-85 | 2:1 | | | 102 | 1,135 | |
| 76 | 85-90 | 2:1 | | | 99.3 | 1,213 | |
| 77 | 90-95 | 2:1 | | | 116 | 432 | |

*Yield is based on formaldehyde, and assumes products exist as polyfurfuryl.
**Note Tests 37 through 46 are not in accordance with the present invention.

EXAMPLE 5

The embodiments of the present invention which are illustrated in this Example were carried out under initially "anhydrous" conditions. That is to say, the ingredients used in the initial reaction mixture included no aqueous solutions and contained substantially no water. Specifically, furan, paraform, and solid oxalic acid were employed as ingredients. The oxalic acid catalyst was used in an amount sufficient to provide 2.8 percent by weight based on the weight of the paraform employed. The reaction ingredients were charged to a steel pressure reactor fitted with a mechanical stirring means, cooling coils, and a thermocouple. The reactor was sealed and heated to a temperature in the range specified in Table V within one-half hour. After the temperature reached the range specified in Table V, the reaction mass was maintained in the specified temperature for a period of 4 hours. Thereupon the reaction mass was cooled to ambient temperature conditions by external cooling means, and the reactor was opened and the following neutralization procedure was employed: aqueous sodium hydroxide (5 percent NaOH) is added to the product mass in an amount sufficient to provide a constant pH in the aqueous phase of the range of 6.5-7.0. It is noted that a substantial quantity of water is formed during the course of the condensation reaction, and that additional water is, of course, added during the specified neutralization procedure employed in this Example. The pH is checked by means of wetting small pH indicating paper with the aqueous phase.

The neutralized reaction mass is filtered through a Celite filter bed to remove solid suspended particles from the liquid resin system. Thereafter, the aqueous layer is decantered, and the aqueous phase is extracted three times with methylene chloride. The methylene chloride extracts are then combined with the organic resin layer, and the resulting mixture is stripped by distillation at 55°-60° C. at a pressure of about 40 mmHg.

The resulting liquid resin is allowed to cool slowly to room temperature, and the viscosity determinations were then made. The results of these tests are summarized in Table V.

EXAMPLE 6

The purpose of this Example is to illustrate the use of solvent in accordance with the process of the present invention. The tests run in this Example were run in an initially "anhydrous" system, and methylene chloride is used as the reaction solvent. The tests were conducted using a 2:1 molar ratio of furan to formaldehyde for 4 hours at the temperature specified in Table VI. The reactions were carried out using the same equipment and heat up procedure described in the preceding Example, and the neutralization procedure employed was identical to that of the preceding Example. The workup procedure was identical to the procedure described in the preceding Example also. The acid catalyst used in this Example was oxalic acid, and it was added in an amount sufficient to provide 1.5 percent by weight based on the weight of the reactant. The methylene chloride in Table VI refers to the number of mls. of methylene chloride per 100 grams of reactants. The results are summarized in Table VI.

TABLE V

| Test No. | Furan:Paraform Ratio | % Yield* | Vis. | Temp.° C. | Cure |
|---|---|---|---|---|---|
| 78** | 0.8:1 | | 7,100,000 | 80-85 | |
| 79 | 0.8:1 | | 7,100,000 | 80-85 | |
| 80 | 0.8:1 | | 4,560 | 85-90 | |

TABLE V-continued

| Test No. | Furan: Paraform Ratio | % Yield* | Vis. | Temp.° C. | Cure |
|---|---|---|---|---|---|
| 81 | 0.8:1 | | 7,100,000 | 90-95 | |
| 82 | 0.9:1 | | 240 | 80-85 | |
| 83 | 0.9:1 | | 7,100,000 | 85-90 | |
| 84 | 1:1 | 19.4 | 48 | 70-75 | 2 min. |
| 85 | 1:1 | 32.7 | 360 | 80-85 | |
| 86 | 1:1 | 44.8 | 2,280 | 85-90 | 2 min. |
| 87 | 1:1 | 46.7 | 700 | 85-90 | 2 min. |
| 88** | 1:1 | 70.3 | >100,000 | 95-100 | |
| 89 | 1.2:1 | 51.0 | 740 | 85-90 | 3 min. |
| 90 | 1.2:1 | 51.7 | 248 | 85-90 | 1½ min. |
| 91 | 1.2:1 | 49.4 | 510 | 90-95 | 2 min. |
| 92 | 1.2:1 | 54.2 | >100,000 | 95-100 | |
| 93 | 1.4:1 | 51.0 | 135 | 85-90 | 2 min. |
| 94 | 1.4:1 | 30.9 | 71 | 85-90 | 1 min. |
| 95 | 1.4:1 | 65.3 | ~100,000 | 95-100 | |
| 96 | 1.6:1 | 44.5 | 152 | 80-85 | 3 min. |
| 97 | 1.6:1 | 41.6 | 284 | 85-90 | 1½ min. |
| 98 | 1.6:1 | 44.2 | 976 | 90-95 | |
| 99 | 1.6:1 | 45.6 | 40,000 | 95-100 | |
| 100 | 1.6:1 | 81.5 | 53,400 | 95-100 | |
| 101 | 1.6:1 | 67.0 | 100,000 | 95-100 | |
| 102 | 1.6:1 | 71.6 | 67,000 | 95-100 | |
| 103 | 1.8:1 | 53.9 | 133 | 85-90 | 2 min. |
| 104 | 1.8:1 | 59.5 | 815 | 90-95 | 4 min. |
| 105 | 2:1 | 50.3 | 63 | 85-90 | 2 min. |
| 106 | 2:1 | 68.2 | 825 | 95-100 | 4 min. |

*Yield is based on weight of paraform charged.
**Note - Runs 78–88 inclusive are not in accordance with this invention.

TABLE VI

| Test No. | MeCl₂ (ml/100g.R) | % Yield* | Vis. (cps) | Temp. ° C. |
|---|---|---|---|---|
| 107 | 30 | 66 | 9,900 | 90-95 |
| 108 | 60 | 65 | 16,660 | 90-95 |
| 109 | 30 | 66 | 11,950 | 95-100 |
| 110 | 60 | 72 | 38,000 | 95-100 |

*Yield is based on the weight of the paraform initially charged.

It is preferred that the catalyst employed be soluble in at least one of the phases of the reaction mass.

It is most preferred that an aqueous system be employed, however. Commercially available formalin, which ordinarily contains approximately 37 percent formaldehyde, can be used as a reaction ingredient. This material also usually contains about 9–12 percent methanol as a stabilizer, and we believe it enhances the solubility of the furan in the aqueous phase as a co-solvent. Mixtures of paraform and formalin are also eminently satisfactory ingredients.

It will be appreciated that water of condensation is formed during the course of the reaction even if the initial ingredients are "anhydrous". Thus, when the "anhydrous" ingredient system is used the formation of water may result in profound changes, during the course of the reaction, in the relative solubilities of the ingredients and/or particular acidic catalyst. Also, as more of the resin is formed, the relative solubilities of the catalyst in the respective phases may also change profoundly.

It is preferred that the reaction mixture include, at the onset of the contacting under acidic conditions, sufficient water to provide a separate aqueous phase in the reaction mixture. The actual weight of water per pound of the reaction mixture which is necessary to provide a separate aqueous phase will depend, of course, on the relative solubility of water in the various reactants in the system, including the catalyst. The more preferred reaction mixture, however, includes at least 10 percent by weight water. At a 10:1 molar ratio of furan:formaldehyde approximately 14 percent aqueous phase is provided when a 37 percent formalin is used as the formaldehyde ingredient.

Mixing should be employed to facilitate the contact of the reaction ingredients in the multi phase reaction mass which is usually encountered in accordance with the present invention. The degree of mixing has not been found to have a significant effect on the results of repeated otherwise identical production tests in accordance with the invention, however.

When substituted furans are used in accordance with the present invention, they are employed in the same manner as furan. It is to be understood that mixtures of furans can be employd as reaction ingredients in accordance with the present invention.

In the Examples herein, as in the preferred embodiments, all of the ingredients were admixed in the reactor at the onset of the reaction. Nonetheless it is not necessary that all the ingredients be initially present in the reactor, and, for example, the formaldehyde can be added incrementally to furan or to the reaction mass as an alternative procedure in order to carry out the present invention.

Resins which are produced in accordance with the present invention range, with respect to polymerization. from substantially non-reactive with respect to direct acid catalyzed polymerization, to very reactive with respect to direct acid catalyzed polyermization. We have found, generally speaking, that resins produced in accordance with the present invention which have more than about 4 percent OH are very reactive with respect to direct acid catalyzed polymerization. Also, generally speaking, terminating the reaction at relatively low degrees of conversion, e.g., 75–85 percent conversion of the formaldehyde initially present, results in very reactive resin product with respect to direct acid catalyzed polyermization. On the other hand, generally speaking, continuing the contacting until substantially all of the formaldehyde (e.g. 97–100 percent) is converted will result in less reactive polymers with respect to diect acid polymerization thereof. While we do not want to be bound by any theory in this regard, it is our belief based on repeated observation that some of the polymeric structures which are present at the relatively low levels of conversion have hydroxymethyl termination therein. It is believed that the hydroxymethyl termination is responsible for the relatively high direct acid polymerization reactivity. On the other hand, as the polymerization continues a larger and larger proportion of the polymeric structures which are present become "capped" with a furan substituent and do not have an available hydroxymethyl substituent for direct reactivity. It is our belief that the furan capped structures are the less reactive species. Nonetheless, we have found that the fully capped furan-formaldehyde resins which are produced in accordance with the present invention can be cured by addition of formaldehyde thereto along with an acid catalyst to achieve a further condensation thereof.

From a consideration of the disclosure herein it will be appreciated that the present invention does indeed provide a method of condensing furan and formaldehyde which is easily controllable with respect to obtaining desired viscosities of the resulting resinous materials and yet utilizes conditions which are sufficiently reactive to permit substantial and relatively high conversions of the furan in reasonable reaction times. In accordance with the present invention a wide range of latitude is available with respect to temperature, catalyst selection and concentrations, reactant ratios and other operating parameters, within which the highly exothermic coupling of furan and formaldehyde is manageably carried out.

We claim:

1. A method for producing a liquid resin comprising: contacting formaldehyde and a furan of the formula:

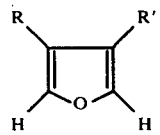

where R, and R' are hydrogen, halogen, alkyl, phenyl, halogen-substituted phenyl, alkyl-substituted phenyl, carboxy, hydroxy-alkyl, or carboxyalkyl, and in which the alkyl substituents have from 1 to 10 carbons, said contacting takes place in the presence of a catalytically effective amount of acid catalyst for a period of time sufficient to produce a liquid resinous material, said furan being present during said contacting in a quantity sufficient to provide more than 1.1 mole of said furan per mole of formaldehyde.

2. The method of claim 1 in which said furan is furan, itself.

3. The method of claim 1 in which said contacting is for a sufficient time and at a sufficiently high temperature to effect a reaction of the furan to such an extent as to provide more than 75 percent of the theoretical conversion based on the formaldehyde initially present in the reaction mixture.

4. The method of claim 1 in which said contacting takes place at a superatmospheric pressure.

5. The method of claim 1 in which the mole ratio of the furan to formaldehyde is greater than 1.5 mole of furan per mole of formaldehyde at all times during said contacting.

6. The method of claim 1 in which said acid catalyst is a member selected from the group of carboxylic acids having a pKa of less than 3.0 at 30° C.

7. The method of claim 1 in which the formaldehyde is added to the reaction mixture in the form of an aqueous solution thereof.

8. The method of claim 1 in which said contacting takes place in an aqueous system.

9. The method of claim 1 wherein said contacting takes place at a temperature in excess of 50° C. and wherein said contacting takes place in a closed system.

10. The method of claim 1 in which the viscosity of said liquid resin is less than 25,000 cps at 30° C.

11. The method of producing a liquid resin comprising: contacting furan and formaldehyde in the presence of a catalytically effective amount of acid catalyst for a period of time sufficient to produce a liquid resin said furan being present during said contacting in a quantity sufficient to provide 1.1 or more moles of furan per mole of formaldehyde.

12. The method of claim 11 in which said contacting is for a sufficient time and at a sufficiently high temperature to effect a reaction of the furan to such an extent as to provide 75 percent or more of the theoretical conversion based on the formaldehyde initally present in the reaction mixture.

13. The method of claim 11 in which said contacting takes place at superatmospheric pressure.

14. The method of claim 11 in which the mole ratio of the furan to formaldehyde is maintained to provide 1.2 or more moles of furan per mole of formaldehyde at all times during said contacting.

15. The method of claim 11 in which said acid catalyst is a member selected from the group carboxylic acids having a pKa of less than 3.0.

16. The method of claim 11 in which the formaldehyde is added to the reaction mixture in the form of an aqueous solution thereof.

17. The method of claim 1 in which said contacting takes place in an aqueous system.

18. The method of claim 1 wherein said contacting takes place at a temperature in excess of 50° C. and wherein said contacting takes place in a closed system.

19. The method of claim 9 in which the viscosity of said resin is less than 25,000 cps.

20. The method of producing a liquid resin comprising: contacting furan and formaldehyde in the presence of a catalytically effective amount of acid catalyst said contacting taking place at elevated temperature above 30° C. and for a period of time sufficient to produce a resinous material, said furan being present during said contacting in a quantity sufficient to provide 1.1 or more moles of furan per mole of formaldehyde.

21. The method of claim 20 in which said contacting takes place at superatmospheric pressure.

22. The method of claim 20 in which the mole ratio of the furan to formaldehyde is maintained at 1.2 or more moles of furan per mole of formaldehyde at all times during said contacting.

23. The method of claim 20 in which said acid catalyst is a member selected from the group carboxylic acids having a pKa of less than 3.0.

24. The method of claim 20 in which the formaldehyde is added to the reaction mixture in the form of an aqueous solution thereof.

25. The method of claim 20 in which said contacting takes place in an aqueous system.

26. The method of claim 20 wherein said contacting takes place at a temperature in excess of 50° C. and wherein said contacting takes place in a closed system.

27. The method of claim 20 wherein said contacting is continued for a sufficient time to produce a liquid resin.

28. The method of claim 20 in which said viscosity is less than 25,000 cps.

29. The resin produced in accordance with the method of claim 1.

30. The resin produced in accordance with the method of claim 11.

31. The resin produced in accordance with the method of claim 20.

* * * * *